Nov. 14, 1967  R. GALLUP  3,353,014
LIGHT BOMB
Filed July 14, 1965
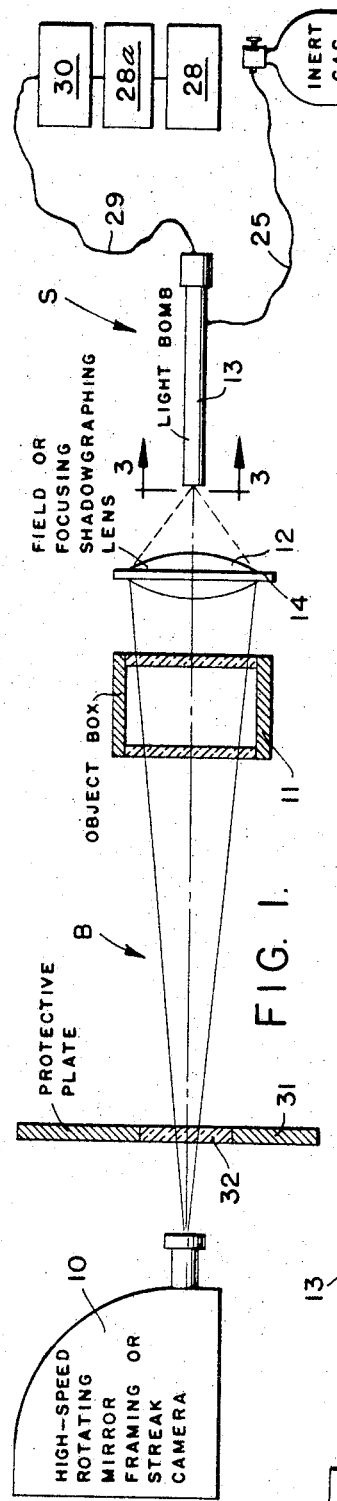
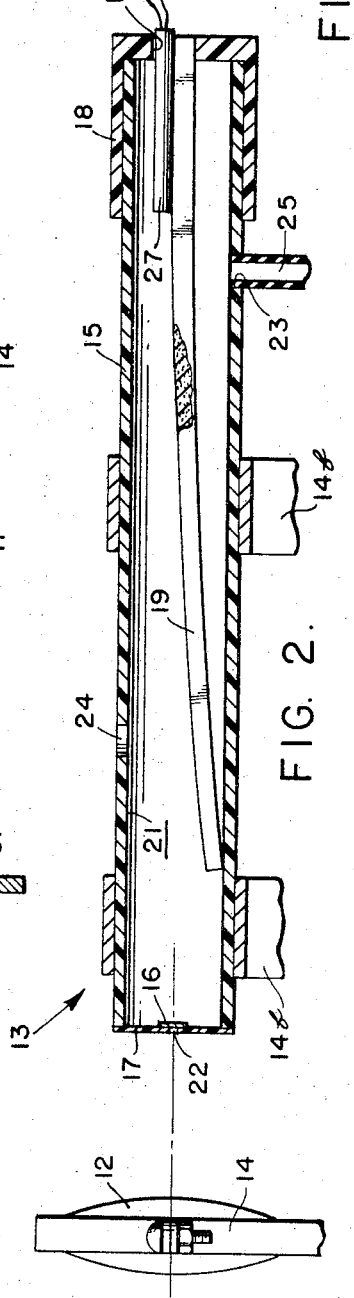
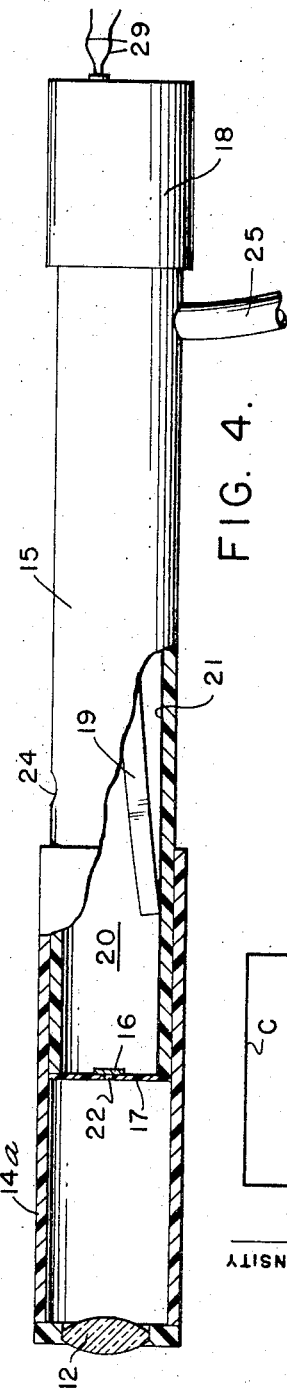
INVENTOR.
ROLLAND GALLUP
BY
P. H. Fisher
ATTORNEY.

United States Patent Office 3,353,014
Patented Nov. 14, 1967

3,353,014
LIGHT BOMB
Rolland Gallup, China Lake, Calif., assignor to the United States of America as represented by the Secretary of the Navy
Filed July 14, 1965, Ser. No. 472,067
5 Claims. (Cl. 240—1.3)

The invention described herein may be manufactured and used by or for the Government of the United States of America for governmental purposes without the payment of any royalties thereon or therefor.

The present invention relates generally to light producing systems and more particularly to an improved light-bomb for use in obtaining shadowgraphs and high-speed photographs, i.e., schlieren-type photographs.

Those concerned with the operation of high-speed framing or streak cameras, operating in the submicrosecond exposure range, have long recognized the need for a variable, simple and economic light source which is capable of providing a directed beam of light, focused or parallel, at an even and sufficient intensity for obtaining submicrosecond exposures through highlight-loss optical systems. This need is particularly acute where shadowgraphing techniques are employed for the study of miniature microtime events.

Heretofore, two basic techniques have been employed for providing the illumination required in microsecond range photography: illumination provided as a consequence of establishing an electrical spark; and passing an explosive shock wave through a relatively thin layer of argon gas, often called an explosive point source technique. Both of the aforementioned techniques, as heretofore known and employed, fail to satisfy existing needs as neither is capable of satisfactorily providing a pulse of light for a selectively variable duration and at flat-peak intensity.

While it is conceivable that electronic systems may be designed and developed for providing the light required, such systems are by nature expensive and complex when compared to systems which provide an explosive point source of light. This characteristic becomes significant in photographic operations wherein the light source must be operatively situated very near the object being photographed, or shadowgraphed, as such objects often are of destructive nature and ultimately destroy the light source. Consequently, one-shot light producing systems, as opposed to systems of a permanent nature, are deemed to more nearly fulfill existing over-all requirements, particularly in instances where a shadowgraphing technique is required for the study of shock waves, and the like, produced in response to a detonation of an explosive charge. Therefore, systems or devices which employ the explosive point source technique for producing required light are of particular importance, as a practical matter.

However, it is fundamental that any device employed must provide a fixed point source of light, in order to maintain constant focus with the optics of any beam-directing system. For this reason the use of systems, which employ the explosive point source technique, has heretofore been inhibited due to the fact that the detonation shock wave, which serves to initiate the required light as it passes through the argon gas, is of necessity in constant motion and serves to establish a constantly moving source of light. Hence, it will be appreciated that the use of known systems, which employ and capitalize on the explosive point source technique for providing directed light beams, has been limited to photographic operations which are of an extremely short duration.

It is the purpose of the instant invention to provide a system which utilizes the explosive point source technique and overcomes the aforedescribed disadvantages without relinquishing the aforedescribed advantages thereof.

It is an object of the present invention to provide, in a system for obtaining shadowgraphs, an improved inert-gas light bomb of simple construction and possessing a capability for providing a fixed point source of light at a constant intensity for an extended, preselected and variable duration of time.

It is another object to provide a compact unit which is to be employed for establishing a directed beam of light in a system which includes a high-speed photographic camera.

It is still another object to provide means for extending the effective operative life of an argon flash bomb whereby the flash bomb may be employed in shadowgraphing operations requiring a fixed point source of light at a constant intensity for an extended period of time within the microsecond range.

Other objects, advantages and novel features of the invention will become apparent from the following detailed description of the invention when considered in conjunction with the accompanying drawings wherein:

FIG. 1 comprises an over-all diagrammatic view illustrating a typical system of a type employing the improved light source, including the explosive device, of the instant invention;

FIG. 2 comprises a partial cross sectional view of one embodiment of the light source of FIG. 1;

FIG. 3 comprises an end view of the explosive device of FIG. 1;

FIG. 4 comprises a partial cross sectional view of another embodiment of the light source of the present invention; and FIG. 5 comprises a graphic view illustrating the intensity curve of light energy obtainable from the light source of the instant invention.

Turning now to the drawings, wherein like reference characters designate like or corresponding parts throughout the several views, there is shown in FIG. 1 a schematic view of a typical photographic system in which the light source of the instant invention may be employed. The system, as illustrated, is arranged for obtaining focusing shadowgraphs, however, it is to be understood that the light source may be employed by other systems which require "flash-lighting" for high-speed camera operations. Briefly, the system illustrated by FIG. 1 is provided with a high-speed rotating framing or streak camera 10 so arranged as to have an object box 11 disposed in the field of view thereof. The object box may be of any suitable and conventional design, well-known to those skilled in the art of shadowgraphing or the art of obtaining schlieren-type photographic recordings of explosive shock waves, and other microtime events, utilizing high-speed, high-resolution framing or streak cameras. As illustrated, the object box 11 is provided with transparent side walls, not designated, through which a light beam B, propagated from the light source S of the instant invention, is directed. The box may, in practice, be sealed and provided with a selected atmosphere through which shock waves, Pugh-pellets and the like may be projected in order that shadows cast by the selected atmosphere may be photographically recorded as the shock waves, Pugh-pellets and the like are projected therethrough.

The light source S includes a field of focusing shadowgraphing lens 12 and an explosive device, generally designated 13. The lens 12 serves to direct the beam B through the object box 11 and may comprise a conventional plastic fresnel lens or, if desired, positive glass lens mounted on a fixed support 14, which may comprise mounting means including conventional V-blocks, ring-supports and the like, FIG. 2. As illustrated in FIG. 4, the source S may be formed as a unit by mounting the lens 12 on a telescoping member 14a which is adapted for receiving one end of the device 13 therein to thus provide for a mounting of the lens 12 adjacent the device 13.

As will hereinafter be more fully described, light is passed from the explosive device 13 as diffused light from a fixed position pinhole source and is subsequently directed as a directed beam by the lens 12. Hence, it is to be understood that the purpose of the lens 12 is to collect and direct the diffused light in a directed beam, through the object box 11, as the light is passed from the device 13. Therefore, the particular design of the lens 12 may be varied as required for the selected operation to be performed. Where the lens 12 is mounted on a separate support 14, V-blocks and mounting members 14b, FIG. 2, may be provided for mounting the housing 15.

Included as the basic components of the explosive device 13 there is a tubular housing 15, FIGS. 2 and 4, a light diffusing member 16, commonly called a diffuser, an end plate 17, and end cap 18, and an explosive charge 19. The housing 15 serves to establish an elongated chamber 20, which, as a practical matter, is lined with a suitable light reflecting liner 21 in order that light generated within the chamber may be projected therefrom, through the diffuser 16, rather than be absorbed by the tubular wall of the housing 15.

The light diffusing member 16 is mounted on the end plate 17 in a manner such that it is disposed within the chamber 20 to intercept light generated therewithin. The member 16 may be formed of any suitable translucent light diffusing material and serves to scatter rays of light as they are passed therethrough. In practice, the diffusing member 16 is formed from a relatively thin square of sheet-stock, clear plastic material, which is frosted by providing a plurality of slight scratches, scorelines or cuts across the surface thereof. It will be appreciated that a maximum quantity of light is desired in the operation of the device 13, consequently, the material from which the diffusing member 16 is formed must be sufficiently translucent for providing the desired output. Hence, the particular material employed in forming the diffusing member 16 may be varied as is necessitated by the use thereof.

In order for diffused light to be conducted from the diffusing member 16, the plate 17 is formed of an opaque material and is provided with an opening 22 formed therewithin, preferably through the center thereof, FIGS. 3 and 4. Therefore, light rays established, as light is generated within the chamber 20, may be diffused by the member 16 and passed to the lens 12 through the opening 22. In view of the foregoing description it will be appreciated that the light diffusing member 16 serves as a point source of diffused light for the source of light as it is caused to be generated within the explosive device 13. Therefore, the position of the member 16 must be fixed with respect to the lens 12 and the position of the lens 12 must be fixed with respect to the object box 11 and camera 10, so that a directed beam of light may be propagated along a path extending from the lens 12 through the walls of the object box to the objective lens of the camera 10 regardless of the manner in which light is caused to be generated within the chamber 20.

Light is generated within the chamber 20 utilizing principles, well-known to those in the flash-bomb art and utilized by the conventional argon flash-bombs, which capitalize on the explosive point source technique. Briefly, it is known when certain inert gases are subjected to a shock wave, light energy is given up as the shock wave progresses. Hence, light is generated within the chamber 20 by subjecting an inert gas atmosphere, such as argon, for example, confined within the chamber 20 to an explosive shock or detonation wave.

The atmosphere is maintained within chamber 20 through a continuous flushing process. The flushing process is carried out through a pair of openings 23 and 24 formed in the housing 15 and extending into the chamber 20. Into the opening 23 there is inserted a length of surgical tubing 25, which is operatively coupled with a pressurized source 26 of inert gas. The source 26 serves to force the inert gas, in a continuous manner, through the tubing 25 and into the chamber 20. The opening 24 functions as a discharge port through which the inert gas may be continuously discharged from the chamber 20. Therefore, it is understood that flushing will continue through the period of time that the explosive device 13 is in an operative state and that a suitable atmosphere will be confined within the chamber 20 throughout this period. The duration of the operative state of the explosive device is determined, primarily, by the length of chamber 20, while the intensity level of the light generated therewithin will depend upon the vitality of the shock projected through the chamber.

It has been found that where a shock wave is initiated and projected from one end of the chamber, the decay of the shock wave, encountered as the wave progresses, causes the intensity level of the resulting light to be depleted. Therefore, in order to provide a constant intensity level for the generated light, the explosive charge is formed as a ribbon and extends substantially the full length of the chamber 20, whereby the charge may be initiated or detonated at one end so that it may be progressively consumed for progressively establishing a shock wave, beginning at the one end and progressing to the other. The material from which the explosive ribbon is formed may be varied, and suitable ribbons are commercially available for this purpose.

The explosive ribbon or charge 19 is detonated by any suitable means, such as an electrical detonator 27, FIG. 2, connected therewith and mounted within an opening 18a formed in the cap 18. The detonator 27 may be of any suitable design and connected with a high-voltage power supply 28, a camera control system 28a, FIG. 1, and a suitable switch 30.

For purposes of operation, the camera 10 is aligned behind a protective plate 31, having a transparent protective viewport or window 32 through which the lens of the camera 10 may be directed so that the camera 10 may be protected from blast effects or shock waves at the time the camera is activated. It will be appreciated that in order to "ready" the system for operation, the objective lens of the camera 10, the window 32, the transparent sides of the object box 11, the lens 12, and the opening 22 must be brought into alignment along a common optical axis, so that the image of the opening 22, as formed by the lens 12, may now be projected onto the surface of the objective lens of the camera as the displacement of the opening 22 is adjusted with respect to the lens 12. With the foregoing alignments and adjustments completed, the explosive ribbon or charge 18 is inserted into the chamber 20 and coupled at the trailing end with the detonator 27. A coupling is now made between the source 26 of argon, or any other suitable gas, and the opening 23, so that desired flushing may be initiated. The detonator 29 may be coupled with the source of electrical potential or power 28. The switch 30 is now prepared for closing at the appropriate instant in time. While not shown, it is to be understood that the switch 30 may be activated by suitable means, such as the means employed for initiating the event to be photographed.

Once a circuit is established between the source of electrical power 28 and the detonator 27, the explosive ribbon or charge 19 is detonated. As the detonation wave progresses along the length of the charge 19 the atmosphere confined within the chamber 20 is subjected thereto, so that light is caused to be generated and projected toward the diffusing member 16 to impinge thereon. As the projected light impinges on the member 16, it is permitted to pass therethrough and be diffused as it is emitted therefrom. The diffused light rays are now collected by the lens 12 and directed toward the objective lens of the camera 10, whereby the shadows established by the disturbance created within the object box 11 may be photographically recorded.

In view of the foregoing description of the present invention, it will be appreciated that the present invention provides for a simple, inexpensive device that is intended to be consumed during the operation thereof, and which provides a fixed point source of light for providing light at a constant intensity over a preselected period of time, as illustrated by the curve C in FIG. 5, within a microsecond range, whereby events occurring in microtime may be photographically recorded.

Obviously many modifications and variations of the present invention are possible in the light of the above teachings. It is therefore to be understood that within the scope of the appended claims the invention may be practiced otherwise than as specifically described.

What is claimed is:

1. In a system for obtaining shadowgraphs, an improved light source, comprising in combination:
    an elongated housing of a tubular configuration including light-reflecting surfaces defining within the housing an elongated open-end, light-reflecting chamber extending the length thereof;
    an end plate disposed across a first end of said chamber including means defining therewithin a concentrically aligned opening extending therethrough in coaxial alignment with said chamber;
    a translucent, frosted, light-diffusing member fixed across said opening adapted to diffuse light energy passed therethrough;
    a shadowgraphing lens fixed in a preselected, displaced and coaxial alignment with said housing, adjacent said opening, and adapted to direct diffused light projected by said diffusing member;
    an end cap mounted across the second end of said chamber including means defining therewithin a passageway extending therethrough in coaxial alignment with said opening;
    an explosive sheet extending from said passageway and terminating near the first end of said housing;
    an electrically activated detonating device seated within said passageway and connected with said explosive sheet adapted to effect a detonation of said explosive sheet in response to an application of an electrical charge;
    means maintaining within said chamber a gaseous atmosphere of a type which will illuminate and propagate light energy when subjected to detonation waves; and
    electrical means connected with said detonator adapted to be activated for causing said detonator to effect a detonation of said explosive sheet, whereby detonation waves are caused to be established near the second end of said housing and travel the length of said chamber so that said diffusing member is caused to project toward said lens diffused light, propagated by the atmosphere maintained within said chamber as it is subjected to detonation waves established through a detonation of said explosive sheet.

2. The combination of claim 1 further comprising means including:
    a tubular telescoping member adapted to be received and slidingly supported by the first end of said tubular housing so that said tubular member and said tubular housing may be mated in telescopting relationship; and
    means mounted on one end of said tubular member adapted to supportingly receive said lens, whereby the displacement of said lens with respect to first end of said housing may be selectively varied through a displacement of said tubular member with respect to said tubular housing.

3. In a light-bomb for use in a high-speed camera system, means comprising in combination:
    housing means defining an elongated chamber therewithin;
    an opaque sealing member fixed across one end of said chamber including means defining an opening extending through said member in a manner such that light waves may be passed from said chamber through said sealing member;
    a light-diffuser fixed across said opening adapted to diffuse light waves passed through said opening;
    means adapted to establish and maintain an atmosphere of inert gas within said chamber; and
    means connected with said chamber adapted to project an explosive shock wave along said chamber for thereby causing said atmosphere to propagate light rays as a moving explosive shock wave is passed through said chamber, whereby the rays of light are caused to pass through said diffuser and be scattered thereby.

4. The combination of claim 3 further including:
    a shadowgraphing lens adapted to collect light rays diffused by said diffuser and direct said rays to converge at a camera lens.

5. The combination of claim 4 further including:
    means defining a light-reflecting liner fixed within said chamber; and
    means slidably mounting said shadowgraphing lens on said housing means.

References Cited

UNITED STATES PATENTS

| | | | |
|---|---|---|---|
| 2,470,139 | 5/1949 | Campbell | 95—11 |
| 2,603,155 | 7/1952 | Clarke et al. | 240—1.3 X |
| 2,653,073 | 9/1953 | Messerly et al. | 95—11 X |
| 2,893,289 | 7/1959 | Edgerton | 350—87 |
| 3,041,936 | 7/1962 | Hull | 350—150 |

NORTON ANSHER, *Primary Examiner.*

FRED L. BRAUN, *Assistant Examiner.*